United States Patent [19]
Thomas et al.

[11] Patent Number: 5,663,883
[45] Date of Patent: Sep. 2, 1997

[54] RAPID PROTOTYPING METHOD

[75] Inventors: Charles L. Thomas; Zetian Wang, both of Salt Lake City, Utah

[73] Assignee: University of Utah Research Foundation, Salt Lake City, Utah

[21] Appl. No.: 517,092

[22] Filed: Aug. 21, 1995

[51] Int. Cl.$^6$ .................................................. G06F 19/00
[52] U.S. Cl. .................. 364/468.26; 364/474.24
[58] Field of Search .............. 364/468.26, 468.27, 364/474.24, 468.24, 468.25; 395/118–120; 156/59, 250, 256, 263–265, 379.8, 517

[56] References Cited

U.S. PATENT DOCUMENTS 5,088,047 2/1992 Bynum .................. 364/474.24
5,514,232 5/1996 Burns .................. 156/517

*Primary Examiner*—Paul P. Gordon
*Assistant Examiner*—Stephen R. Garland
*Attorney, Agent, or Firm*—Trask, Britt & Rossa

[57] ABSTRACT

A rapid prototype modeling system operates to first electronically decompose a discrete part represented by an STL file into thick layers, which are then electronically sliced into cross sectional slices the thickness of a sheet of construction material. The slices are cut from sheets of the construction material in a pattern which permits construction of the layers by stacking the sheets. The layers are then stacked appropriately to create a physical model of the discrete part.

14 Claims, 19 Drawing Sheets

Microfiche Appendix Included
(1 Microfiche, 56 Pages)

RAPID PROTOTYPING METHOD

MICROFICHE APPENDIX

This application includes a computer program listing printout submitted in the form of a microfiche appendix as provided by 37 CFR 1.96(b). The appendix consists of one microfiche with a total of 56 frames.

BACKGROUND

1. Field

This invention relates to prototype modeling techniques. It is particularly directed to the construction of solid patterns derived from 3D CAD software-generated models.

2. State of the Art

Current rapid prototyping (RP) technology offers many advantages over more traditional prototyping techniques. For example, RP decreases the time required to produce an initial prototype. Currently available RP systems are generally flexible, and produce prototypes of superior accuracy. Unfortunately, they are also significantly more expensive to utilize than are traditional systems. Available techniques include stereolithography, laminated object manufacturing, fused deposition modeling, selective laser sintering, and ballistic particle manufacturing. These techniques in general operate on a common paradigm. They each decompose the part into a series of layers or cross sections. The part is then constructed by sequentially creating each layer and bonding it to the previous layer. This bonding usually occurs automatically as a part of the layer creation process. In the case of laminated object manufacturing, each layer is bonded prior to cutting the outline of the cross section. In any event, while several different parts may be built simultaneously on a common build platform, each layer of each discrete part must be created in sequential order.

Traditional RP techniques incorporate various techniques for dealing with cantilever overhangs in the part during construction. A support structure is often created in stereolithography systems. In some systems, the excess material surrounding each cross section provides the necessary support. Parts with complex curves have little contact area with the support structure during the construction procedures of many existing RP techniques. For example, a sphere theoretically contacts the build platform at a single point. As the sphere is built up from this point contact, it can easily shift, destroying the registration of the layers. For a more generalized part, the operator must decide how to orient the part, attempting to minimize overhangs and maximize the support provided by the building platform.

Construction of prototype parts by the application of RP technology usually requires the use of high-priced materials. Prohibitive costs have limited the proliferation of RP application to well-financed users, typically large companies with correspondingly substantial development budgets and RP service bureaus which demand large fees. Schools and typical smaller enterprises often cannot justify the acquisition of RP systems. There is a need for an inexpensive system capable of making RP technology directly accessible to small businesses and students.

SUMMARY OF THE INVENTION

This invention provides an inexpensive rapid prototyping method which has particular application in the field of education as well as in various industrial fields. Practice of the method is facilitated with a novel system which typically interconnects commercially available hardware and software elements through customized hardware and software elements. The cost of the complete, fully operational system is significantly less than (typically, a small fraction of) the cost of current state-of-the-art RP systems. The accuracy of a prototype fabricated using a rudimentary system of this invention is adequate to demonstrate the form of a modeled object. More refined versions may in some instances produce prototypes adequate to meet fit or function requirements. In any case, the system of this invention is affordable for schools and small businesses. It allows the designer to make a physical inspection of a design at a very low cost, typically two or three orders of magnitude below the cost associated with prototyping by currently available RP technologies.

The system of this invention creates a part from a series of cross sections as do conventional RP systems. A fundamental departure from prior systems resides in the layup iterations followed in bonding sequential layers together. This invention first creates all of the layers required, and then bonds the layers together, through a separate efficient procedure. This step, and the nature of the construction materials utilized, introduce significant additional flexibility to the final construction process. The invention avoids, for example, the limitation of existing RP systems whereby the layers must be created sequentially, one layer at a time.

According to this invention, the part is first decomposed into thick slices, or layers. These layers can be positioned to eliminate unwanted overhangs prior to cutting the outline of the cross section. The system provides added flexibility by permitting the operator to mirror selected thick layers, building any such layer either from the bottom up or the top down. Thus, when making a sphere, the first thick section will be constructed from the top down, thereby providing a large area of contact between the build platform and the part. Subsequent layers are built from bottom to top because they have adequate contact area as so oriented. This mirroring of one of the layers is then corrected for during the subsequent assembly of the thick layers.

The system operates to arrange thick layers of a single discrete part across a build platform. These layers may then be sliced to the thickness of the construction material. As a consequence, this invention can often create a part that requires many slices from few sheets of construction material. Assuming that a part is sufficiently small that a single sheet of construction material can accommodate 8 thick layers, 64 slices can be registered and bonded in 14 steps instead of 63. (The 8 sheets are registered and bonded, requiring 7 steps. Then the resulting 8 sections are registered and bonded, requiring 7 more steps.)

A typical rudimentary system of this invention comprises a plotter, a personal computer, a simple registration stand (build table) and the software (ZWSLICE) disclosed in the microfiche appendix. ZWSLICE reads 3-D solid models from commercially available drawing software, and electronically cuts them into paper-thin slices. The software-generated slices are converted to physical slices cut out on the plotter. The physical slices (typically of paper, plastic or other sheet material) are then stacked on the build table to construct a physical embodiment of the computer model. These embodiments may be treated as prototype parts. Alternatively, they may be used as patterns for constructing molds or shells from which to cast parts from metal or other rigid material. In other instances, they may be used as paper molds from which to produce plastic parts.

The invention may be embodied as an inexpensive rapid prototyping device that creates physical models from 3D electronic CAD models. It performs this function by generating a series of cross sections, slicing the part into many layers. Each cross section is cut from sheet construction material (usually paper) using a commercial sign making plotter. The cross sections are registered and laminated together, forming the physical model. A primary advantage of the system of this invention is that the initial cost of the requisite hardware and software, as well as the cost of producing a typical part, are 10 to 20 times less expensive than existing rapid prototyping techniques. Assuming that the user already owns a computer and CAD software, the additional hardware and software required to complete the system may have a retail price on the order of a typical personal computer assembly.

Individual sheets of construction material may include a construction layer and a backing layer fixed to the construction layer with adhesive material. Individual physical slices may then be cut from the construction layer, leaving the backing layer intact. Individual pluralities of the physical slices may then be distributed in corresponding patterns among an ordered set of construction sheets. The plotting step may include locating index positions on the sheets of construction material, and the cutting step may include the placement of registration holes at the index positions through the construction sheets. The holes facilitate the precise registration of respective pluralities of the physical slices carried by individual construction sheets within the set when all of the construction sheets are stacked in the order of the set with registration pins inserted through the registration holes. The registration holes may also be located to facilitate the precise registration of constructed layers when they are stacked to recompose the object.

Building speed is dependent upon a number of factors, including part dimensions, layer thickness, and operator skill. Typical building speeds range from about one-half to about 8 hours per vertical inch. Because models can be constructed of readily available paper materials, construction costs are trivial compared to other RP systems.

BRIEF DESCRIPTION OF THE DRAWINGS

In the drawings, which illustrate what is currently regarded as the best mode for carrying out the invention:

FIG. 2a illustrating an STL representation of a solid model, and FIG. 2b illustrating that model sliced in the x, the y, and the z directions;

FIG. 6a illustrating unsupported overhangs which may occur, and FIG. 6b illustrating a solution to this problem through hierarchical model decomposition;

FIG. 8b illustrates the cope and the drag elements of a mold;

FIG. 11 is a two-part drawing of which FIG. 11a illustrates an actual part, while FIG. 11b illustrates a layered paper mold designed for that part;

DESCRIPTION OF THE ILLUSTRATED EMBODIMENTS

Figure 1:
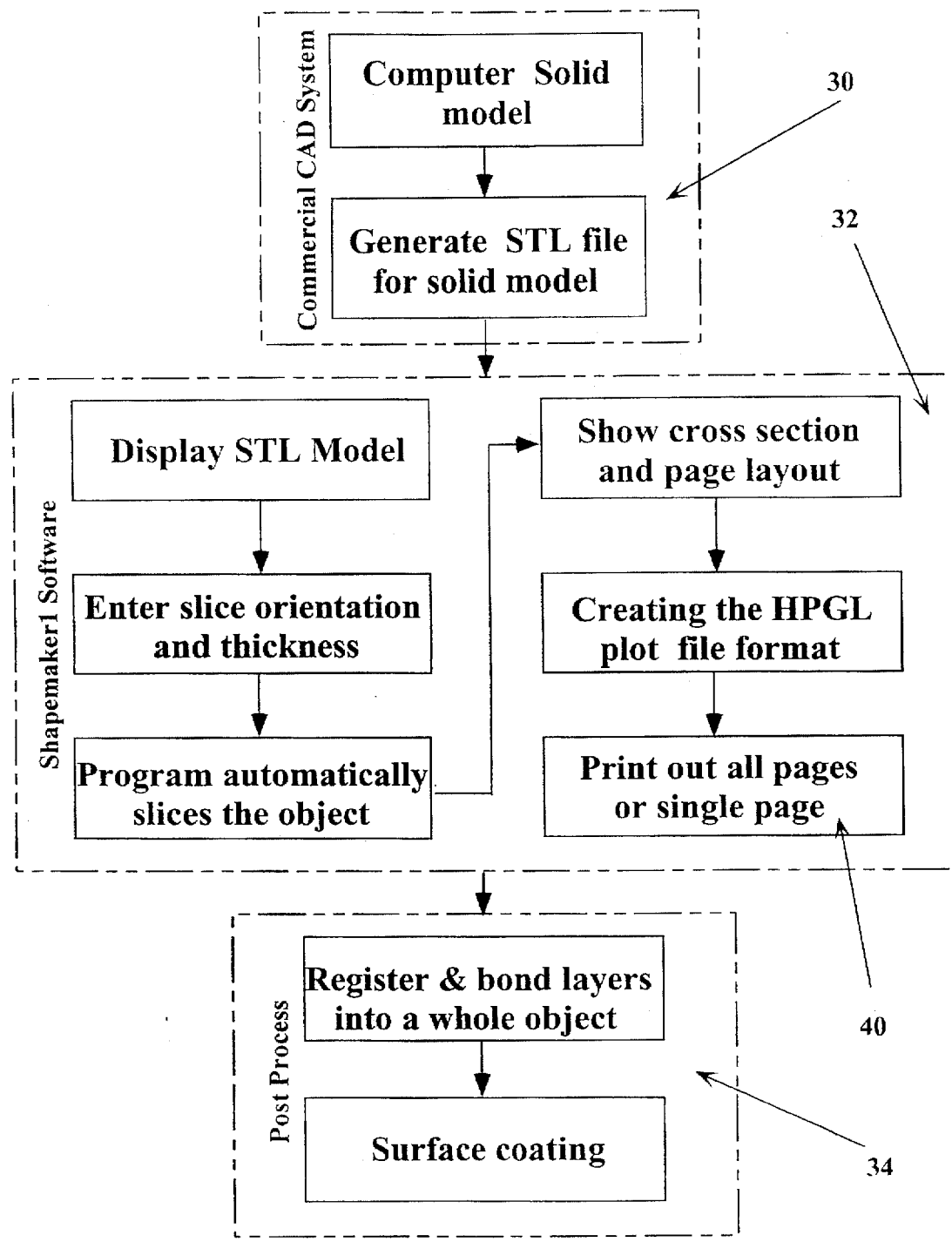
FIG. 1 is a flow diagram of a typical embodiment of the invention.

FIG. 1 outlines the operation of a typical embodiment of the invention. As shown, a commercial CAD system, designated generally 30, is configured to provide an input file in conventional STL file format. Software, such as that disclosed in the microfiche appendix, designated generally 32, operates on the STL file to create an HPGL plot file and to print out all of the pages. The pages (sheets) are registered in proper sequence, and are bonded and coated to create a physical object (model or pattern) in a post process, designated generally 34.

Figure 2A:
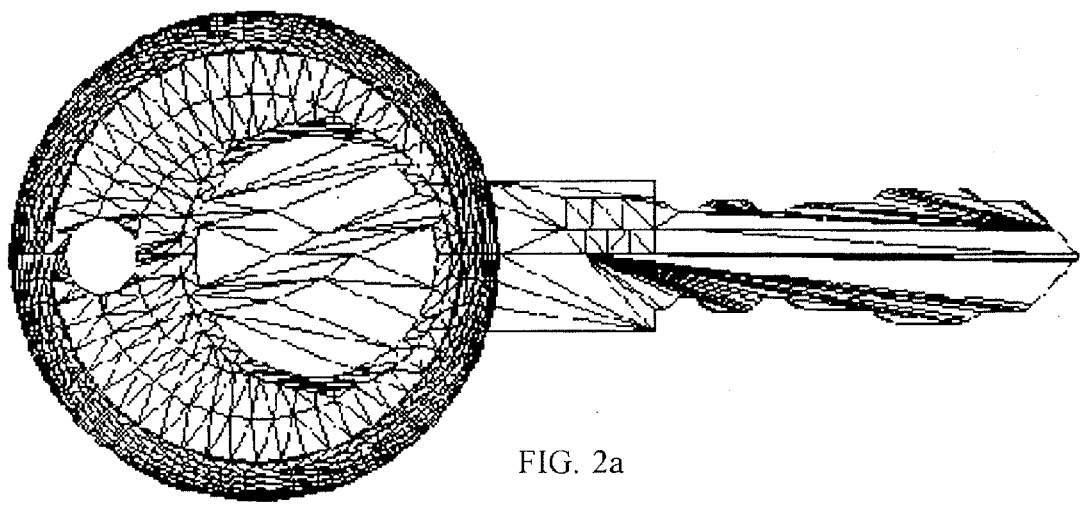
FIGS. 2a and 2b is a pictorial representations in two parts.
Figure 7:
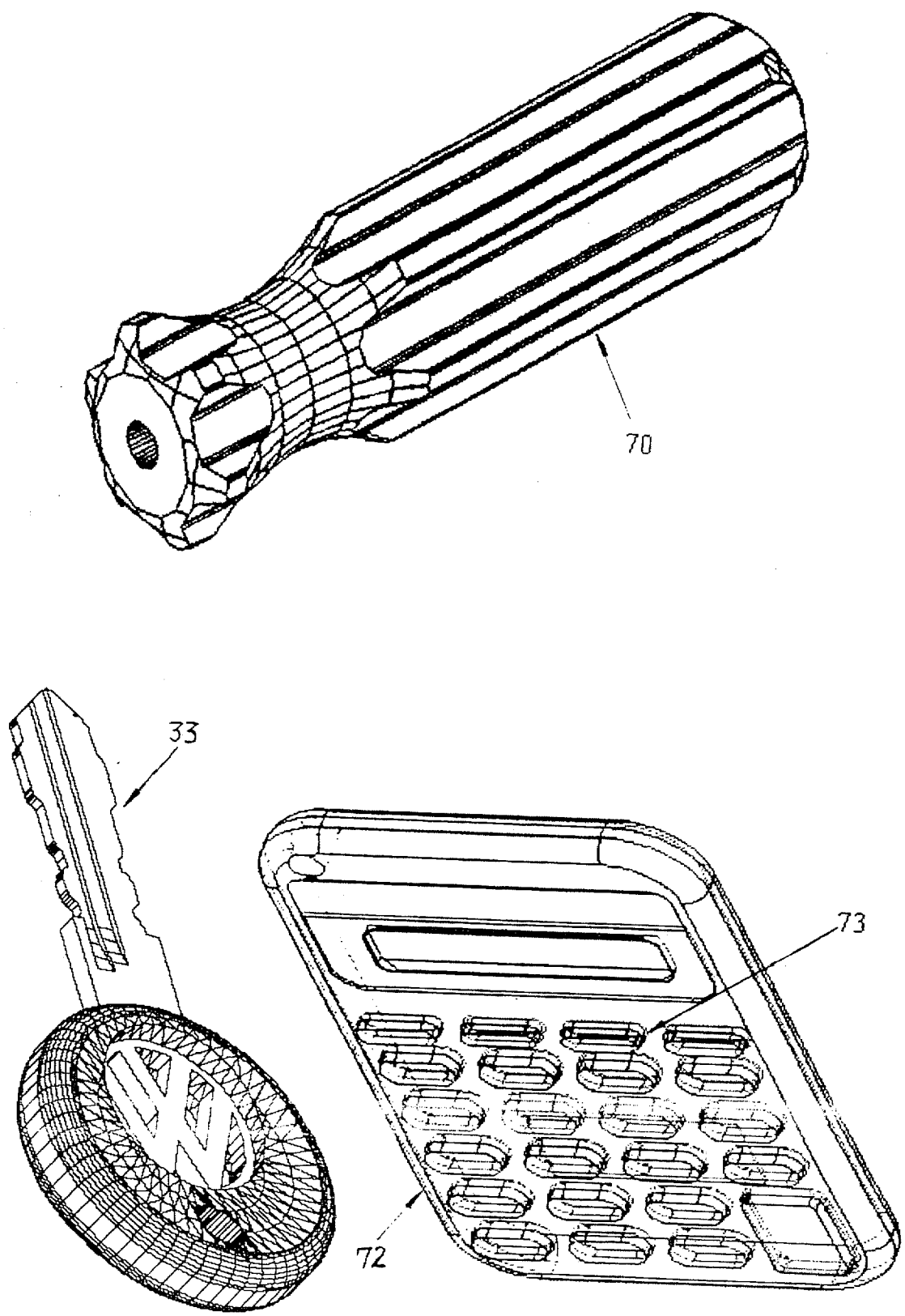
FIG. 7 is a pictorial view of typical prototype parts which may be constructed by the system of the invention.

Currently available CAD software packages capable of generating a solid model provide an output file which can be converted into an STL file format (a faceted representation of the model). The surface triangles of the STL format combine to approximate the surfaces of the model, as shown by FIG. 2a. The accuracy of a faceted representation depends upon the chord height selected for the CAD software. The chord height is the distance between an actual curve and the straight line approximation of this curve. The smaller the chord height, the more accurate the representation of the model. The minimum attainable chord height varies for each CAD software. There are many commercially available solid modeling CAD programs, such as AUTOCAD, CADKEY, and Pro/ENGINEER, that can create the STL file format. FIG. 2a shows an example of an STL representation of a solid model of an ignition key part 33 (FIG. 7).

Figure 2B:
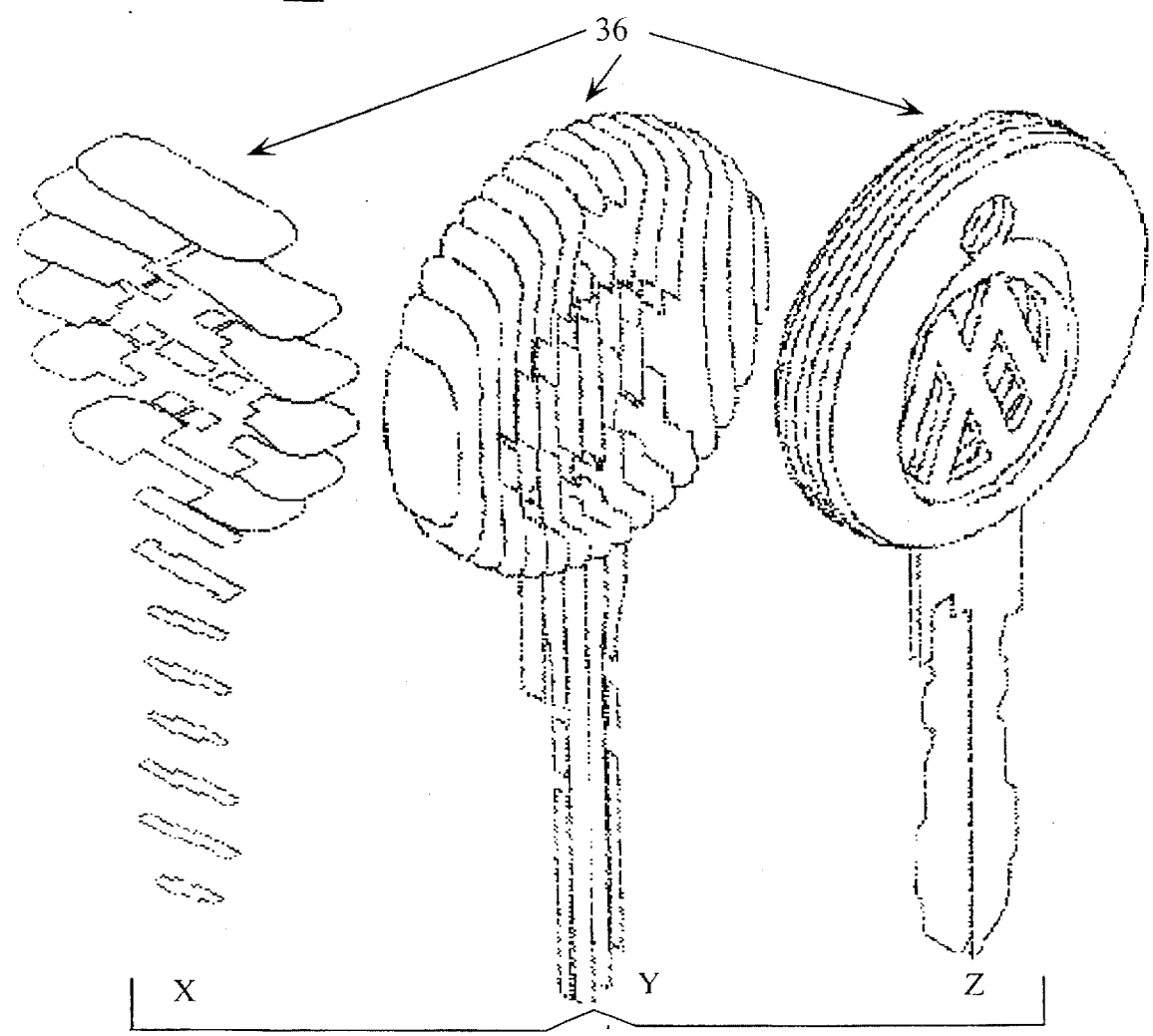

The software 32 (microfiche appendix) can read and display an STL file generated by any CAD program. The operator can change the orientation of a part by rotating it. The software 32 gives the maximum dimensions of the input part in the x, y, and z directions so that the operator can choose the best direction for slicing the part. After the software has finished slicing the whole object, each cross section (thick layer) is displayed on the screen so that the operator can verify that the axis of slicing minimizes the number of layers 36 and maximizes accuracy. FIG. 2b shows the part illustrated by FIG. 2a sliced in the x, the y, and the z directions. The slicing orientation resulting in the lowest number of layers 36 is usually preferred.

Figure 3:
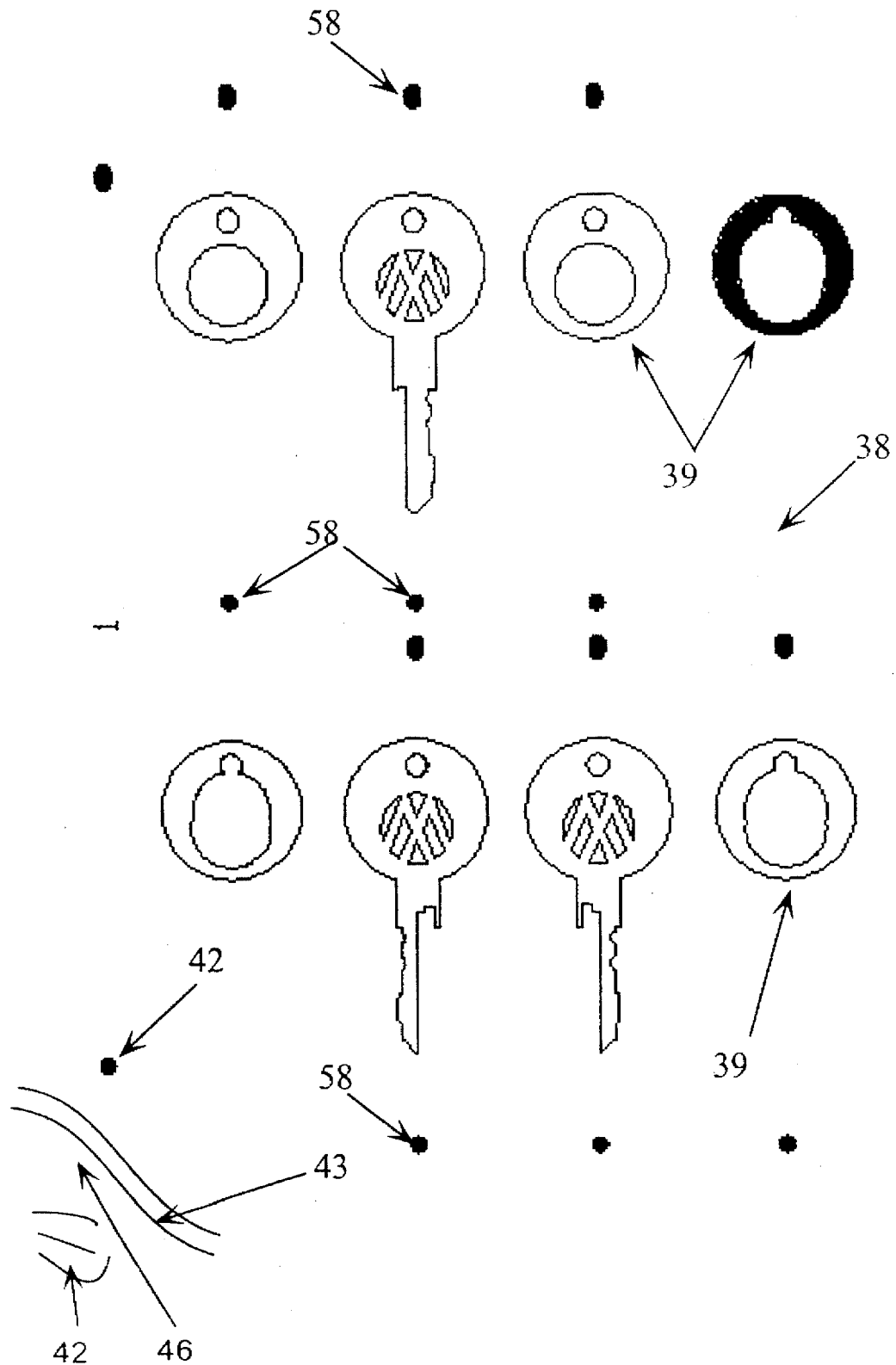
FIG. 3 is a sketch of a plot file illustrating the layout of slices of the part of FIG. 2 and registration holes on one sheet of construction material.

Referring to FIG. 3, the software 32 (FIG. 1) automatically calculates and lays out the maximum number of layers 36 that can be represented on one construction sheet 38. The thick layers 36 are sliced into parallel thin slices 39 (the thickness of the construction sheet material) arranged on the sheet 38 beginning from the bottom to the top and then from the left to the right, until the entire sheet 38 is filled.

Each sheet 38 of cross section slices 39 is sorted and converted to HPGL plot file format (32, FIG. 1), which is output to a sign making plotter (40, FIG. 1). The plotter cuts slices 39 of the part, and automatically adds registration holes 42 (FIG. 3) on each sheet. Each sheet 38 illustrated by FIG. 3 consists of two layers—paper 43 held by adhesive 44 to a backing layer 46. Preferably, only the paper 43 is cut to produce a slice 39, leaving the backing 46 intact. However, registration holes 42 are cut completely through the sheet 38. The operator has the option of choosing from several construction materials. The most common are readily available label paper and foam sheet materials.

Figure 4:
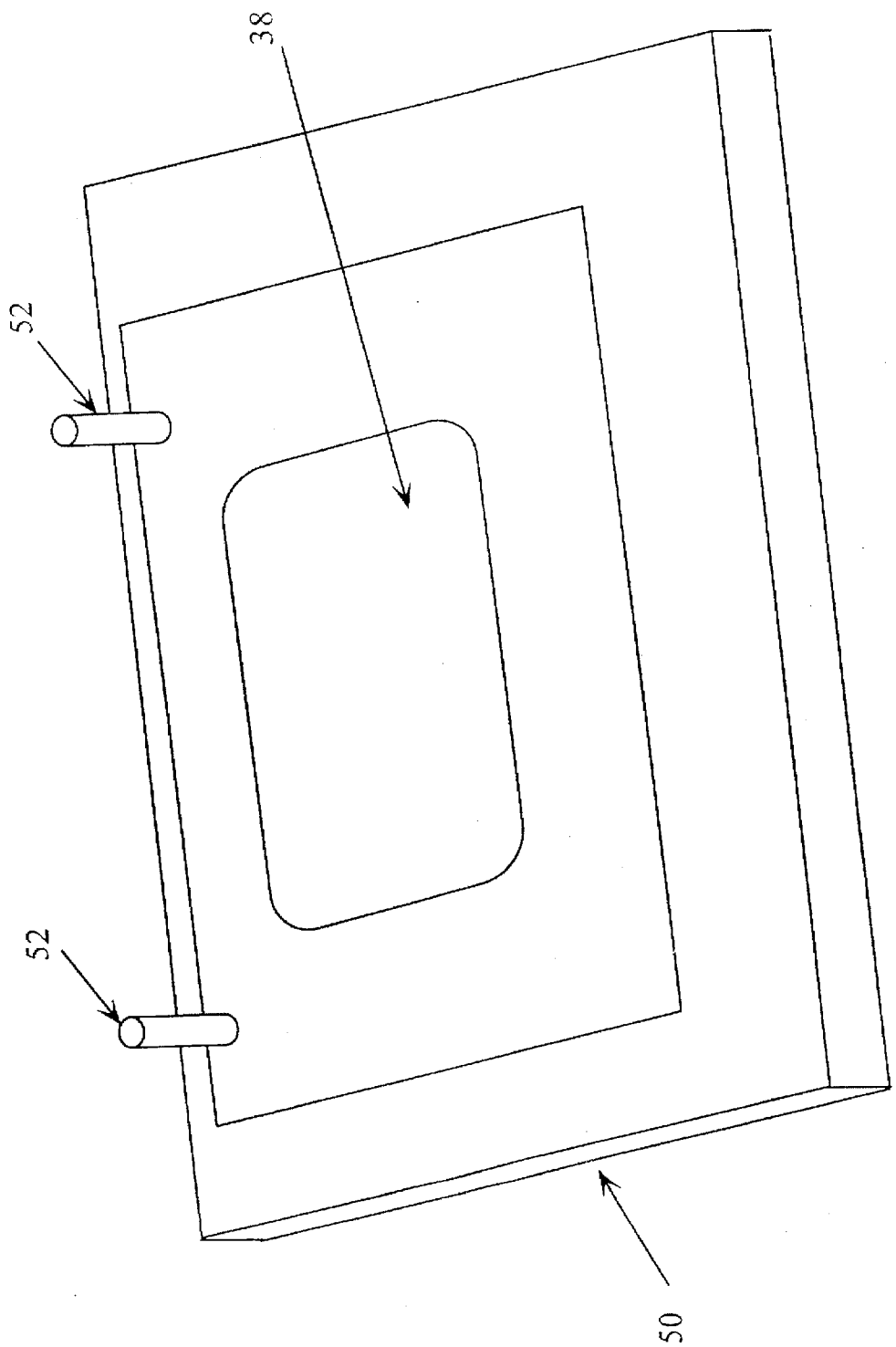
FIG. 4 is a pictorial view of a registration table of the invention.
Figure 5:
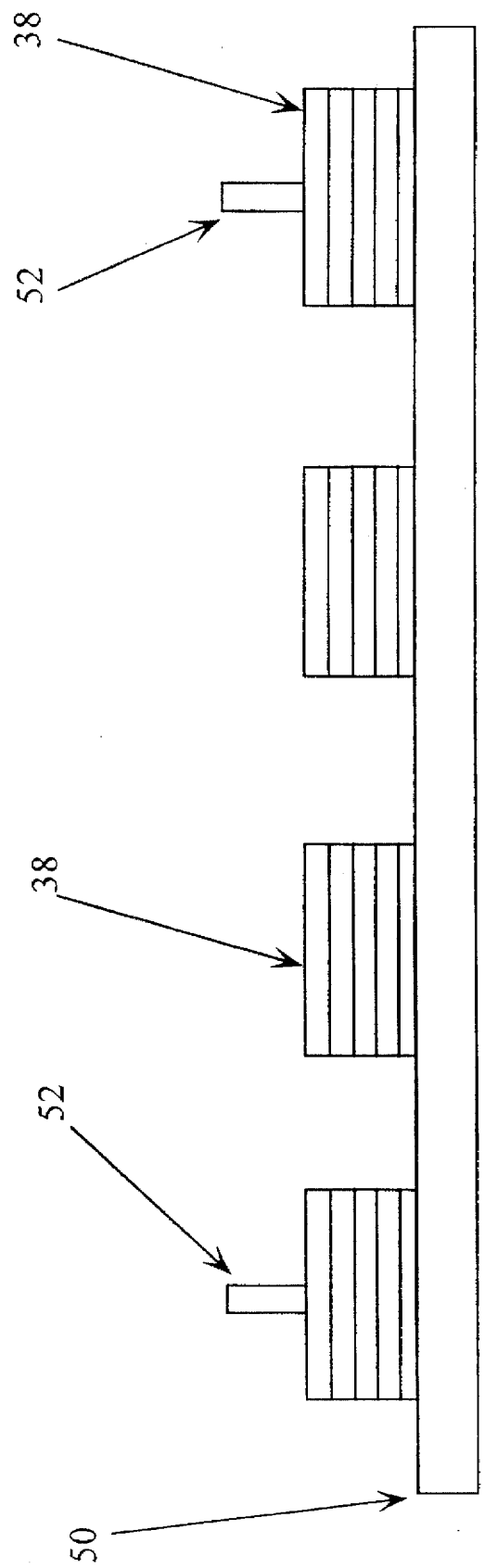
FIG. 5 is a view in elevation of the registration table of FIG. 4 illustrating a stacked arrangement of the slices from a plurality of sheets of the type illustrated by FIG. 3.

Once all the sheets 38 have been cut, they are mounted in order on a registration table, generally 50, as shown in FIG. 4. The sheets 38 are registered by means of the pins 52 inserted through appropriate registration holes 42 (FIG. 3). Stacking of the sheets 38 organizes the slices 39 carried by respective stacked sheets into reassembled layers, generally 36 (FIG. 5). The sheets are usually stacked with the backing layer 46 up. As each sheet 38 is stacked, the backing layer 46 is peeled off (and excess construction layer 43 removed), leaving residual adhesive 44 on the upper surface of the registered slices 39. The slices carried by the next sheet 38 that is stacked are thus glued firmly to the previously stacked slices 39 in proper arrangement. As illustrated, the whole decomposed object is first recomposed into its component thick layers 36 (FIG. 5). These thick layers 36 may be separated and stacked, being positioned by a second set of registration holes 58 (FIG. 3) created by the software 32 to complete the construction of the solid object.

After construction, the modeled (recomposed) parts are given a coating to increase their rigidity, to prevent layer delamination, and to cover areas where the adhesive 44 is exposed. This coating may comprise paint, acrylic coating or glue, and is typically applied by spraying techniques or by dipping the recomposed part in a coating material.

A notable characteristic of the present invention is the opportunity it provides to evaluate the geometry of the part (See FIG. 7) being built and to decompose the part into a convenient number of thick layers 36, each capable of further slicing into a plurality of thin slices 39. By efficient layout of layers 36, a maximum number of slices 39 may be laid out on one sheet 38, as shown in FIG. 3. As illustrated, the part being built is small enough for eight layers 36 of slices 39, having the maximum dimensions of the part, to fit on a single sheet 38. This "hierarchical model decomposition" approach allows eight layers to be stacked simultaneously, greatly reducing build time. Another advantage of hierarchical model decomposition is its inherently efficient utilization of construction material. For example, if the part in FIG. 3 requires 70 slices 39 to build, but eight slices 39 fit on a single sheet 38, only nine sheets 38 are required, rather than the conventional 70 sheets. The nine sheets 38 may be stacked first, resulting in eight layers 36. The eight layers 36 may then be stacked in order. That procedure requires a total of 15 stacking iterations, rather than the 70 iterations which would otherwise be required.

Figures 6A, 6B:
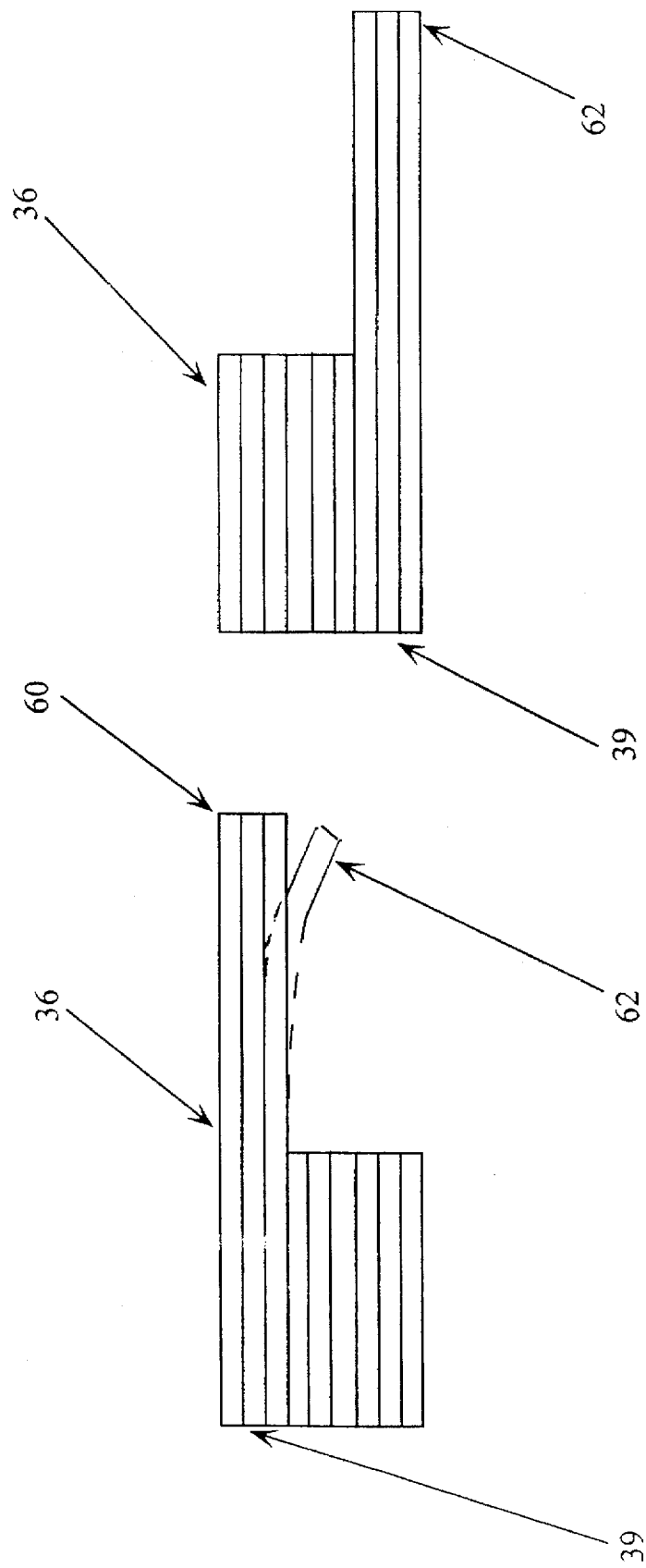
FIGS. 6a and 6b is a two-part views in cross section.

As the part is stacked, there are potentially unsupported overhangs, generally 60, as shown in FIG. 6a. If the overhang is large, and many layers are stacked on top of it, the inherent cantilever effect tends to bend the part at the overhang, as indicated in phantom 62. This problem is solved with hierarchical model decomposition, whereby a parting line 64 can be defined by the operator right at the overhang as illustrated in FIG. 6b.

Often layers built from the bottom up, such as shown by FIG. 6a, develop overhangs 60. It is often preferable for such parts to be built upside down, as shown by FIG. 6b. Sometimes, it is preferable for only certain sections of a part to be built upside down, and others to be built right side up. These arrangements can be accomplished if the part, or a section of the part, is mirrored, so that the top faces down, and the parts are stacked with the top going down first, and the bottom going down first, as shown in FIG. 6b. This construction approach eliminates overhang and improves the stability of the part during construction. It is generally preferable for layers 36 to be organized such that smaller slices 39 are stacked on top of larger slices 39 during the layup procedure.

EXAMPLES

Several prototype parts were built following the system illustrated by FIG. 1 and utilizing the software disclosed in the microfiche appendix. The parts discussed in the following examples are shown in FIG. 7, and were built out of 0.005 in thick label paper.

I. Screw driver handle

The screw driver handle 70 shown in FIG. 7 was drawn in Silverscreen, a 3-D modeling software. This example demonstrates the advantages of hierarchical model decomposition and mirroring, both of which are provided by the software 32. The part 70 was made from paper construction material, utilizing 207 slices. Registering and bonding these slices sequentially would have been very tedious. The part was decomposed into 8 thick layers which were built simultaneously. The 207 slices were thus cut from 26 sheets, reducing the number of registration and bonding operations from 207 to 32.

As can be seen from FIG. 7, any outside slice of the part 70 will inherently have very little surface area. To avoid creating overhangs (See FIG. 6a), the software 32 mirrored the initial outer section. The thicker slices could then be layed up first. The mirroring action required the software 32 to reverse the location of the registration holes 58 created by the software. Hence, the mirroring was automatically corrected when the thick layers 36 were subsequently assembled. The total build time for this part was about 3 hours.

II. Ignition key

The ignition key 33, also shown in FIG. 7, was drawn in Pro/ENGINEER. This example demonstrates the advantage of being able to define parting line(s) while decomposing the model. It also utilized hierarchical model decomposition. The need for building support blocks was eliminated by defining a parting line through the center of the overhanging portion of the key. This parting line avoided overhanging portions. The whole model was decomposed into 61 slices 39 organized into six thick layers 36. The total build time for this part was about 2 hours.

III. Calculator

This part (72, FIG. 7) was drawn in Pro/ENGINEER. The part was decomposed into 61 slices organized into 6 thick layers which were built simultaneously. Construction of this part presented a particular problem when registering the keyboard keys 73. The slices containing the key cross sections were stacked on top of the base slices. This arrangement caused the base which had its sticky side up and extra material around the keys to stick together. This problem was solved by either covering the exposed area on the base layer with a non stick surface or by peeling the unwanted material from each of the layers containing the key cross sections before bonding. The total build time for this part was about 3 hours.

It is often desirable to create a prototype that has significant physical properties not provided by the construction materials used to fashion patterns in accordance with FIG. 1. Those patterns can be converted to metal parts, either directly or following enhancements of the kind routinely followed by pattern makers more closely to match the specifications of a desired finished part. Conventional techniques exist to create metal parts from prototypes made of foam and paper. Investment casting, sand casting, and lost foam casting techniques may be followed to produce metal parts from the patterns produced by this invention.

IV. Sand casting

Figure 8A:
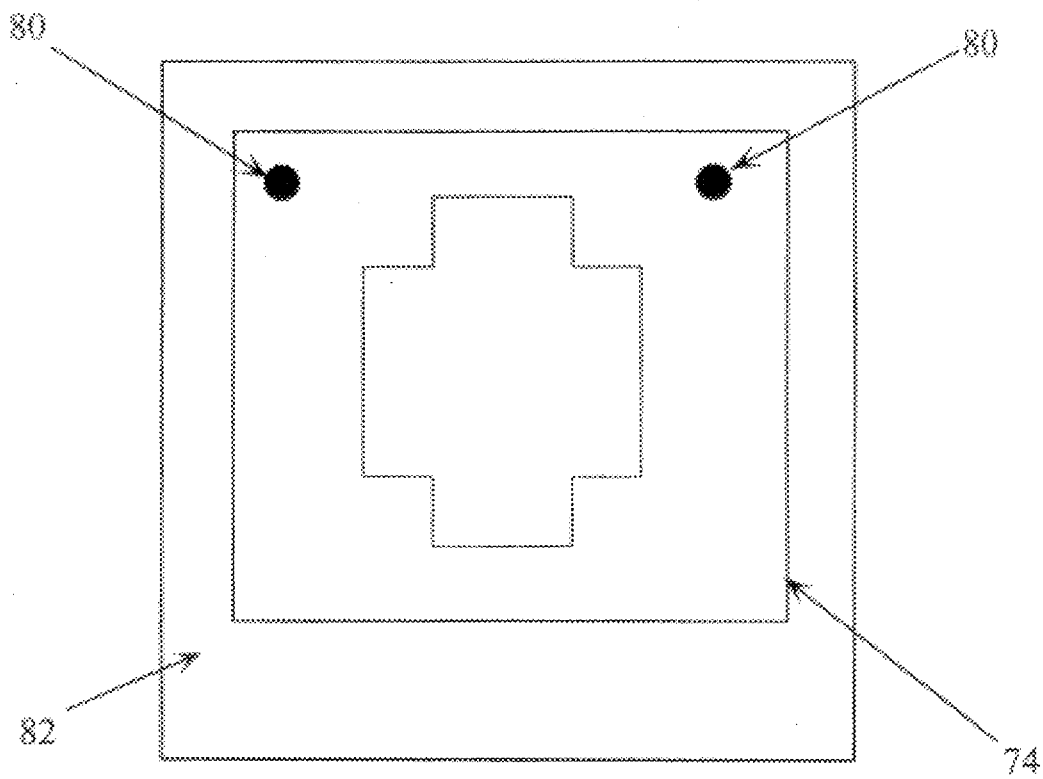
FIGS. 8a and 8b a two-part drawing of which 8a illustrates the layup of a pattern useful for sand casting.
Figure 8B:
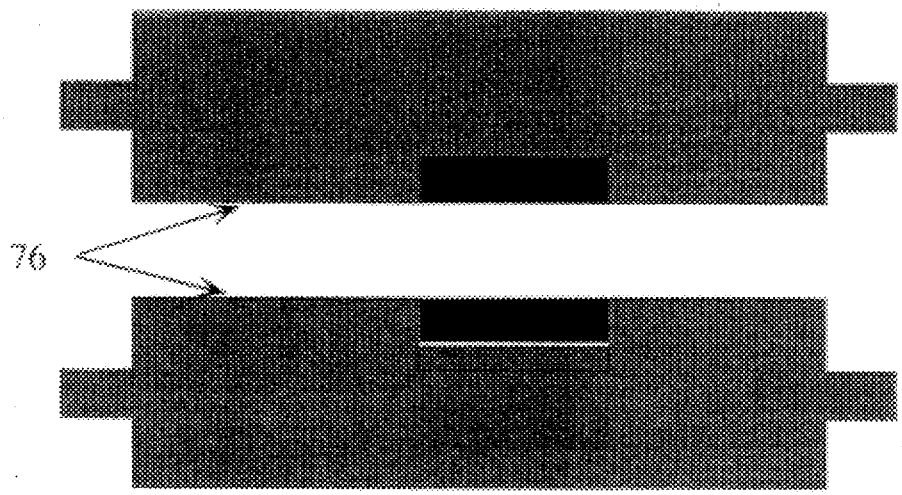

Sand casting can be used to obtain metal parts from paper models constructed in accordance with this invention. FIGS. 8a and 8b illustrate the manner in which the desired model is built from the CAD drawing 30 in two halves with each half 74 separated by a parting line 76 which is defined by the designer. As illustrated by FIG. 8a, two holes 80 are created on each of these pieces for registration. These parts are then coated with a suitable material to prevent contact between the adhesive surface of the part and the sand. Each half is then registered and bonded to the base 82 of the cope and the drag using two removable pins (not shown) provided on the base of each half through the holes 80. The standard sand casting procedure can then be followed by ramming sand in the cope and the drag with the runners and the pattern in place. After the ramming, the pattern can be removed from each of the two halves, resulting in the required sand cavity. The cope and the drag can then be assembled and casts can be made.

V. Investment casting

Figure 9:
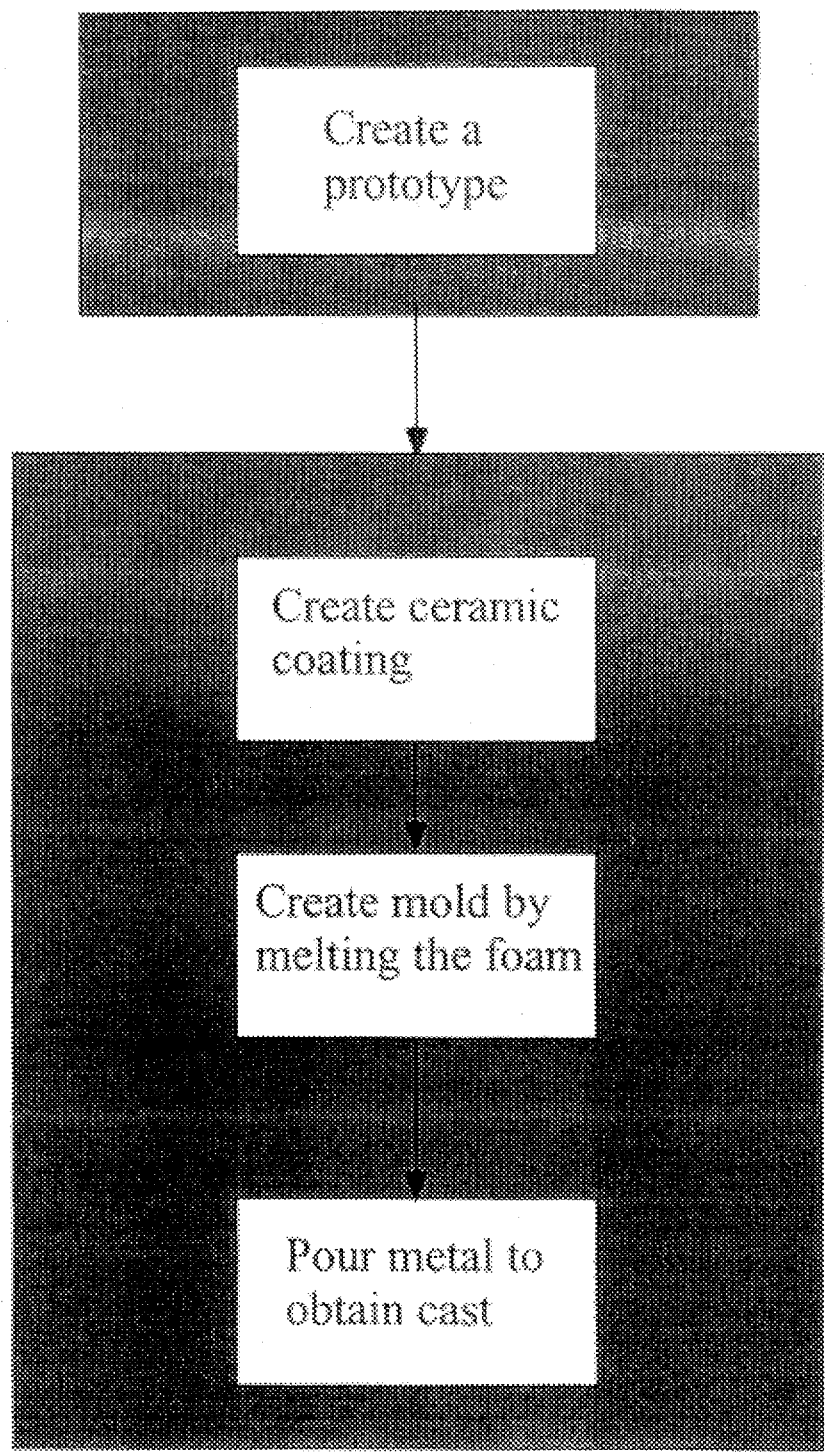
FIG. 9 is a flow diagram illustrating an investment casting procedure utilizing prototypes constructed in accordance with the invention.

Investment casting is usually used to create metal parts from prototypes made out of foam or wax. This process can be implemented on foam models constructed by the software 32 of this invention. As shown by FIG. 9, the desired part is prototyped from a CAD model using layers of foam. The prototype is then directly dipped into a slurry of refractory material until a thick ceramic coating is obtained. This mold is then heated, first in an inverted position at a temperature of 200° to 375° F. for about 12 hours, and then in the upright position at a temperature of 1200° to 1900° F. to completely melt away the foam prototype and create a hollow ceramic shell. Molten metal can then be poured into the hollow portion to obtain the finished casting.

VI. Lost foam (Evaporative pattern) casting

Figure 10:
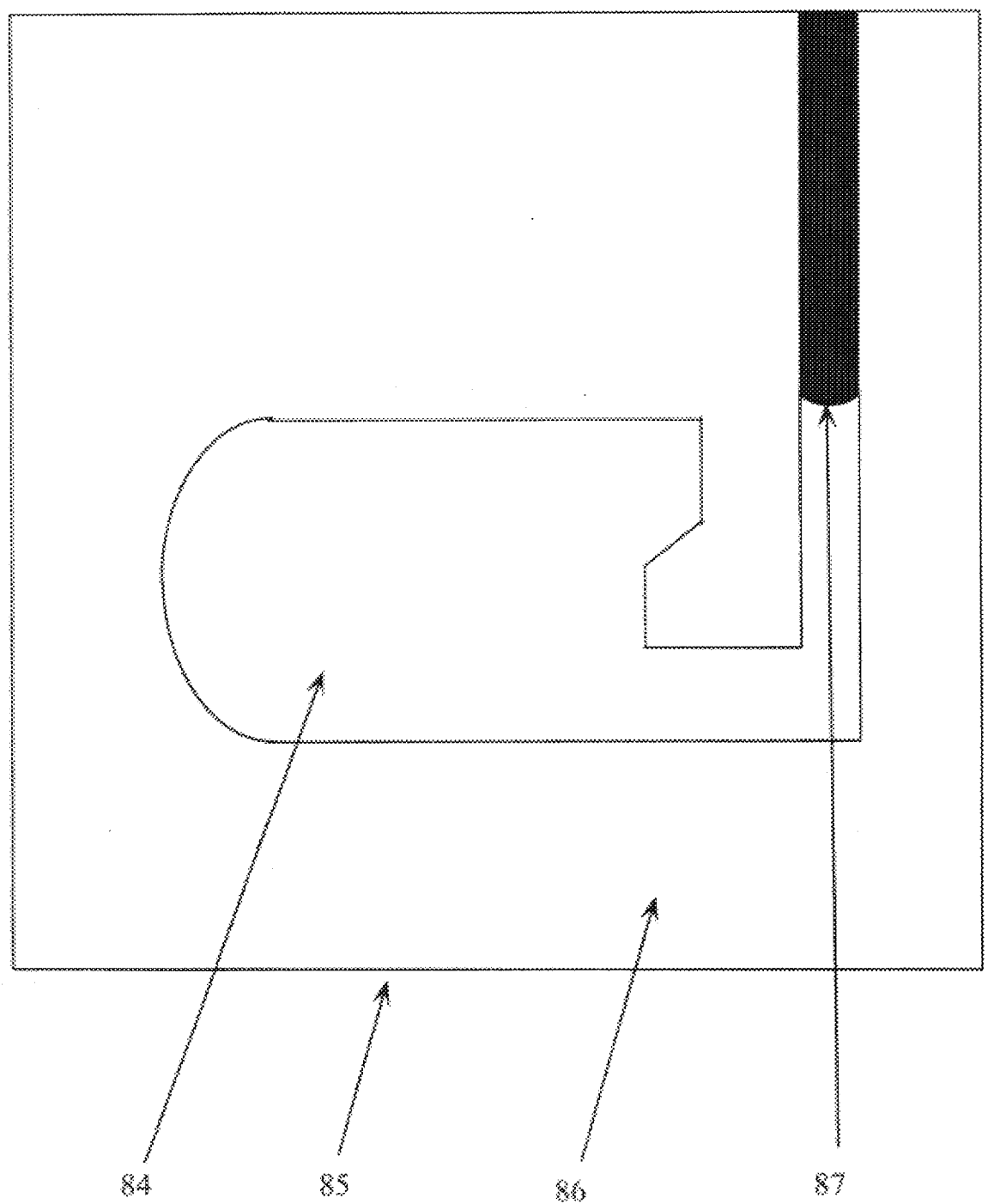
FIG. 10 is a schematic illustration of a lost foam casting utilization of a foam model produced in accordance with the invention.

Lost foam casting can be applied to obtain metal parts from models created by this invention as illustrated by FIG. 10. The desired prototype is first drawn in a CAD software. A sprue and a vent are then added to the model within the CAD software. The software 32 can then be utilized by an operator to build a foam model 84 from this drawing. This foam part is then placed in a flask 85 and covered with sand 86. Molten metal poured into the sprue 87 instantaneously evaporates the foam resulting in the metal filling the volume previously occupied by the foam.

VII. Paper molds for plastic parts

Figure 11:
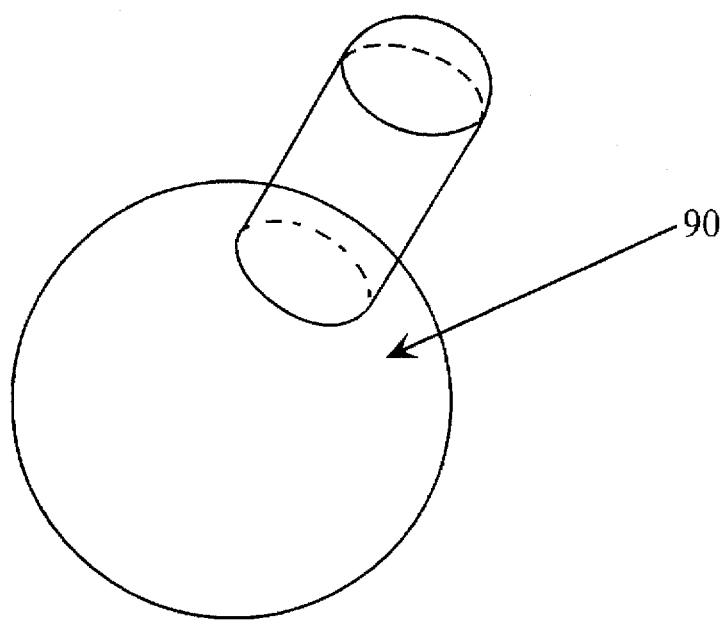
Figure 11:
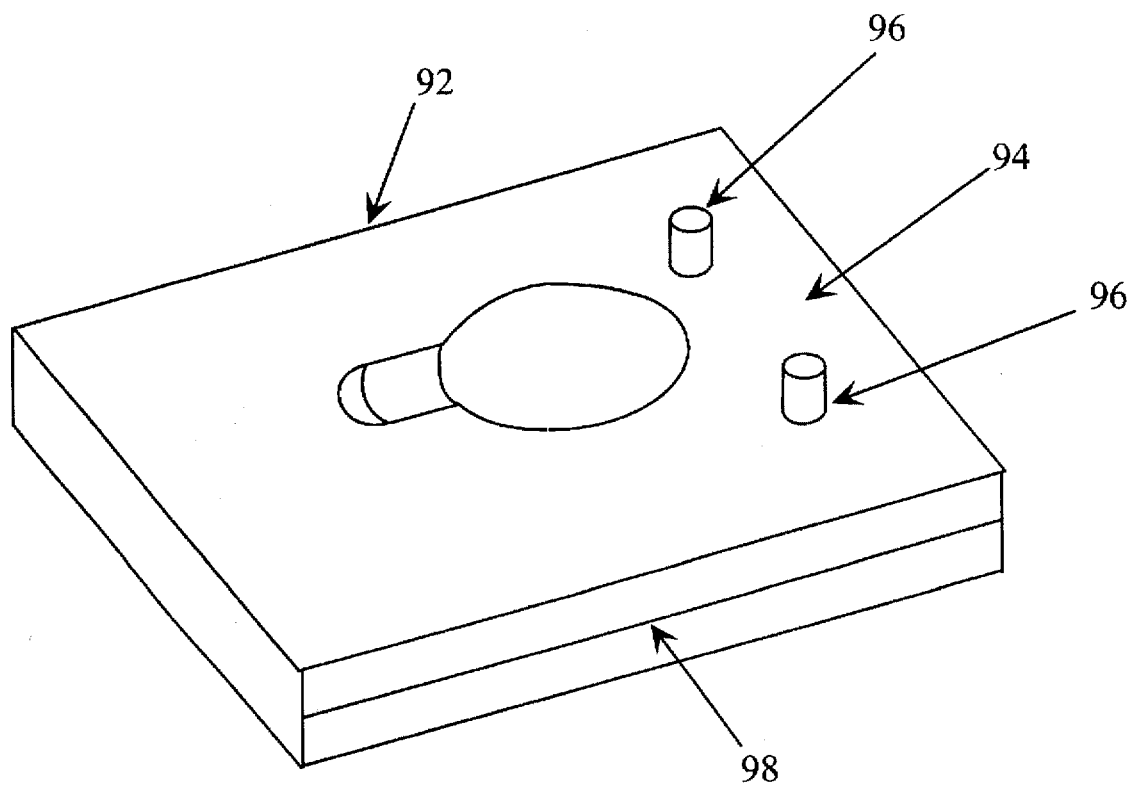

Prototype paper molds for parts drawn on the computer can be used to make parts from any room temperature molding material as shown by FIG. 11. Starting with a part 90, a mold 92 may be designed using Pro/Mold design, a module of Pro/ENGINEER. The mold 92 may be made up of two halves with a parting surface 94 that is defined by the designer. Two registration holes 96 are also created on each of these halves. The two pieces are built using procedures illustrated by FIG. 1 and the software of the microfiche appendix. They are then coated with a suitable material to prevent adhesion between the paper and the molding material. The two halves are then mounted on respective base pieces 98 for increased rigidity using the two removable pins provided on each of these base pieces and the holes created in the CAD system for accurate registration. The two pieces are then registered and put together, and can be used to create parts by room temperature molding.

FIGS. 12a–17b illustrate the operation of a system of this invention which consists of commercially available and custom elements arranged to provide a variety of functions. The elements of the system are as follows:

3D CAD Software:
    The system is compatible with any CAD software that is capable of generating a 3D model and converting it to standard Stereolithography format. Common packages that have this capability are: CADKEY, Autocad, Pro-Engineer, and SilverScreen.

Computer to operate software:
    The software (ZWSLICE) described in detail in the microfiche appendix is currently written in the DOS environment, requiring a PC compatible computer.

Sign making plotter:
    A suitable such device is the PNC-9000 made by Roland Digital. Other HPGL plotters with cutting capabilities are also considered to be suitable.

Construction material:
    The system works with adhesive backed sheets of material up to 1 mm in thickness. The material must be compatible with the cutting blade supplied by the plotter. For the Roland plotter, suitable materials are standard label paper available in 8½" by 11" by 0.005" thick sheets and adhesive backed polystyrene foam sheets available in 0.027" thickness.

Adhesive spray:
    Preferred building technique requires that the first layer of the part be sticky on both sides. This requirement is satisfied by coating the top of the first layer with a commercial spray adhesive.

ZWSLICE software:
    This software is used to generate cross sections from the model, create plot files, and organize the cutting and assembly process. ZWSLICE provides the following capabilities:
        Load and view Stereolithography format files (3D models).
        Select layer orientation and preview part sliced in this orientation.

Automatically decompose part into thick layers, and arrange to cover the full sheet of construction material.

Allow operator to choose whether each thick layer will be built from bottom up or top down. (Mirror function)

Slice this array of thick layers into thin slices which are the same thickness as the construction material.

Generate HPGL plot files for each sheet of construction material including part cross sections (slices) and any necessary registration holes.

Display each cross section individually.

Display the complete plot file for each construction sheet.

Interact with operator to plot any or all of the sheets.

Store plot files for future use.

Figure 12A:
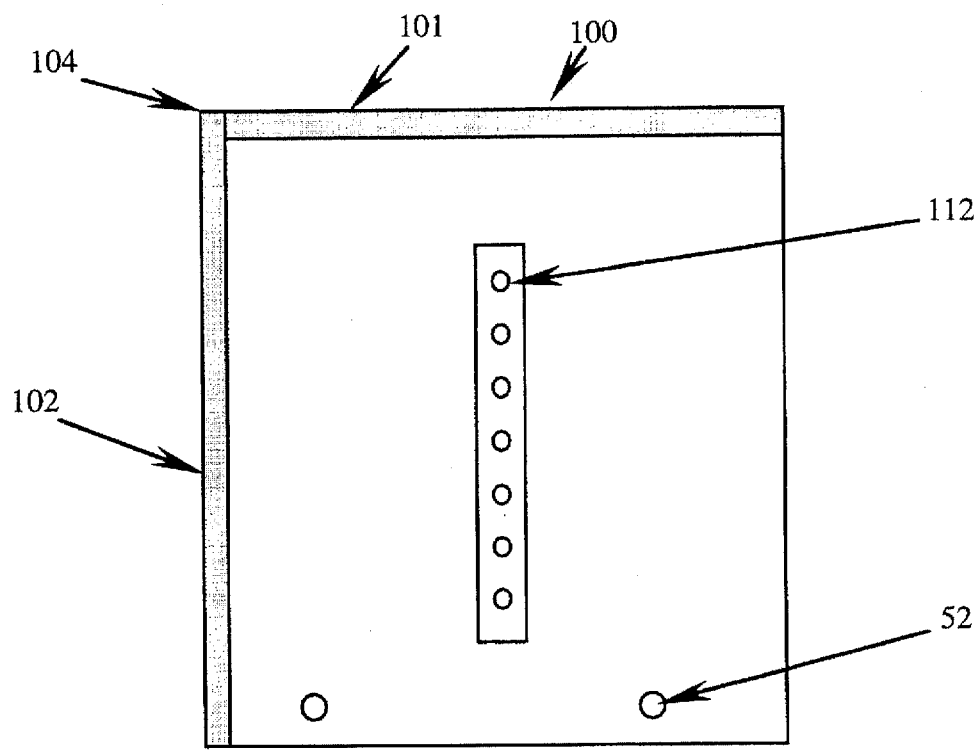
FIG. 12a and FIG. 12b are plan and elevation views, respectively, of a registration platform of the invention
Figure 12B:
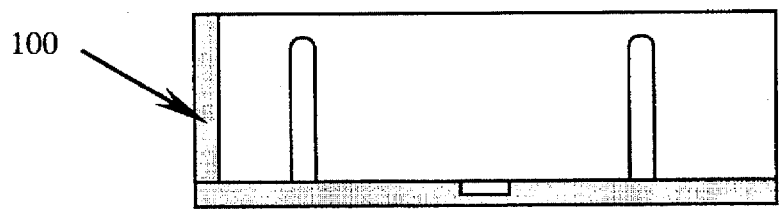
Figure 12C:
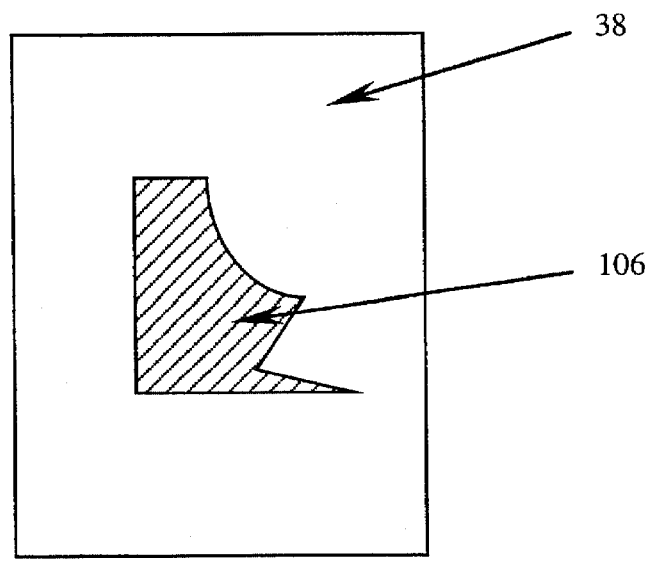
FIG. 12c, is a plan view of a typical sheet of construction paper.
Figure 12A:
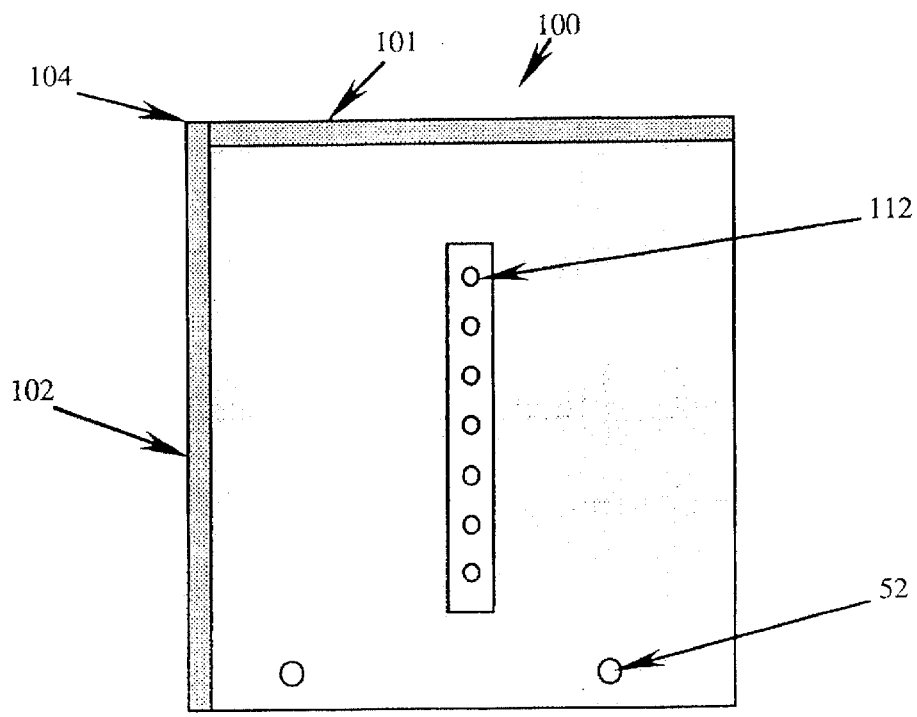
Figure 12B:
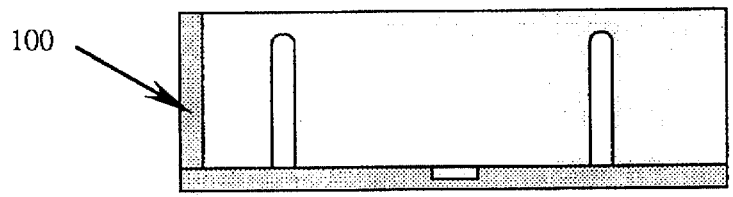
Figure 12C:
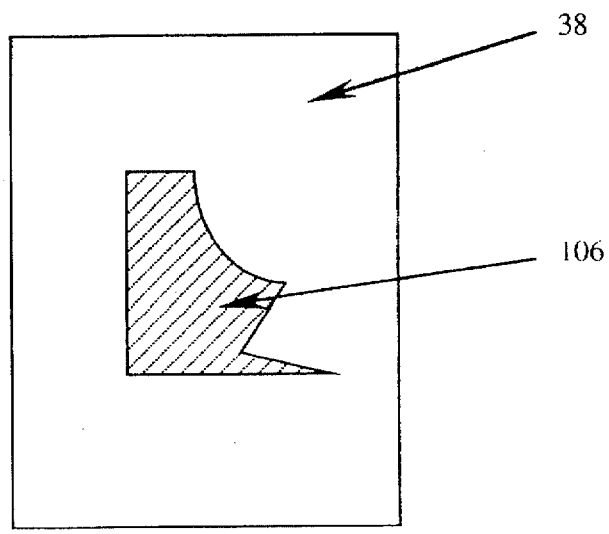
Figure 13A:
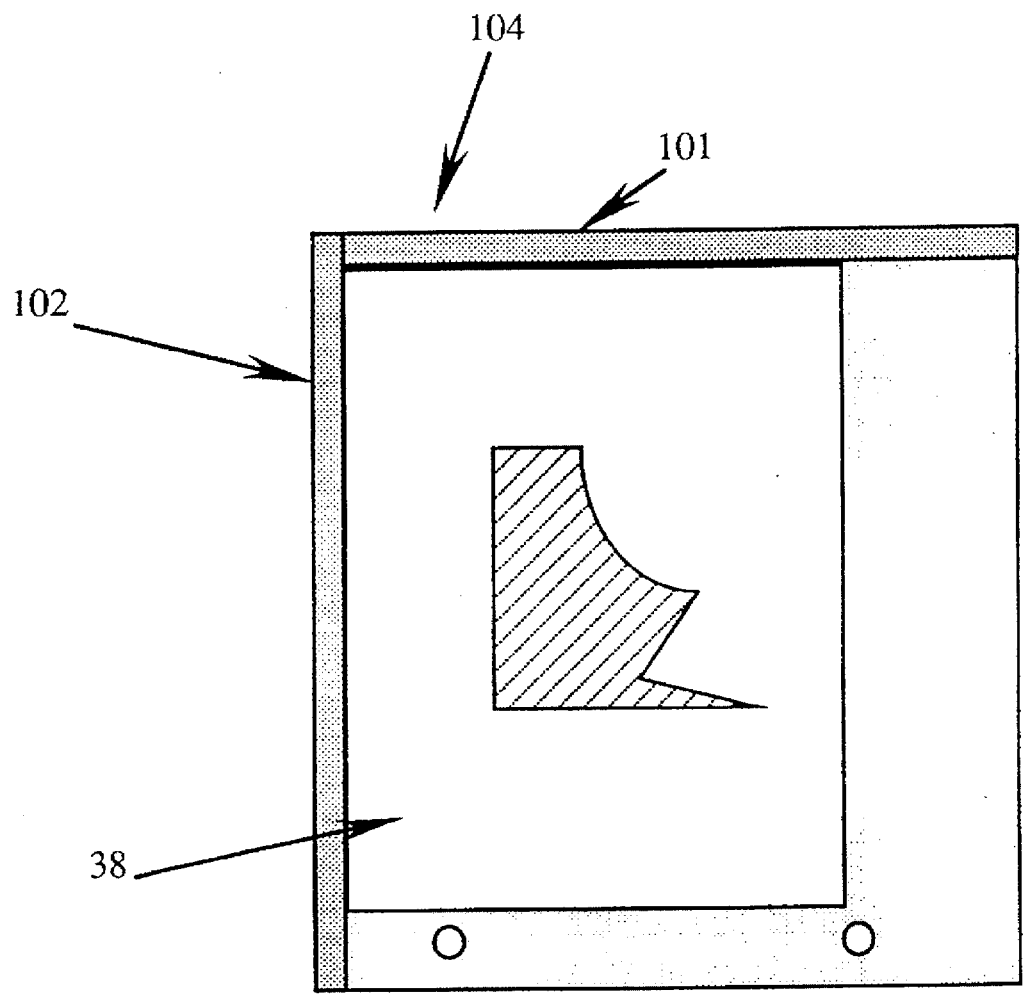
FIG. 13a and FIG. 13b are similar to FIGS. 12a and 12b, and illustrate the manner in which a sheet such as that illustrated by FIG. 12c may be positioned on a registration table of the invention.
Figure 13B:
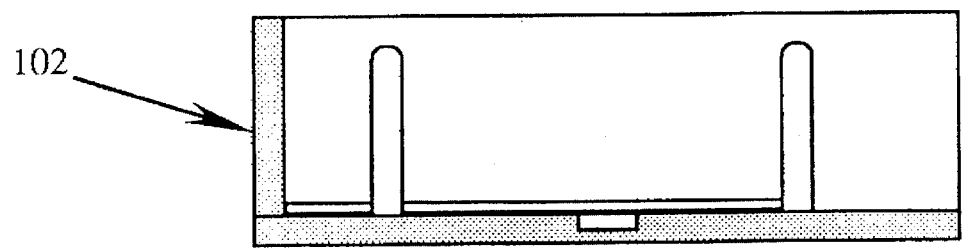

Registration system for alignment of layers:

The registration system, generally 100, shown in FIGS. 12a and 12b allows a variety of registration options:

Corner Box alignment. As shown by FIGS. 13a and 13b, if the construction sheets 38 are carefully aligned in the plotter, the cross sections will be accurately registered to the edges of the construction sheet. Sequential sheets are aligned by aligning two edges of each sheet with the guide mils 101, 102 of the corner box, generally 104.

Figure 14A:
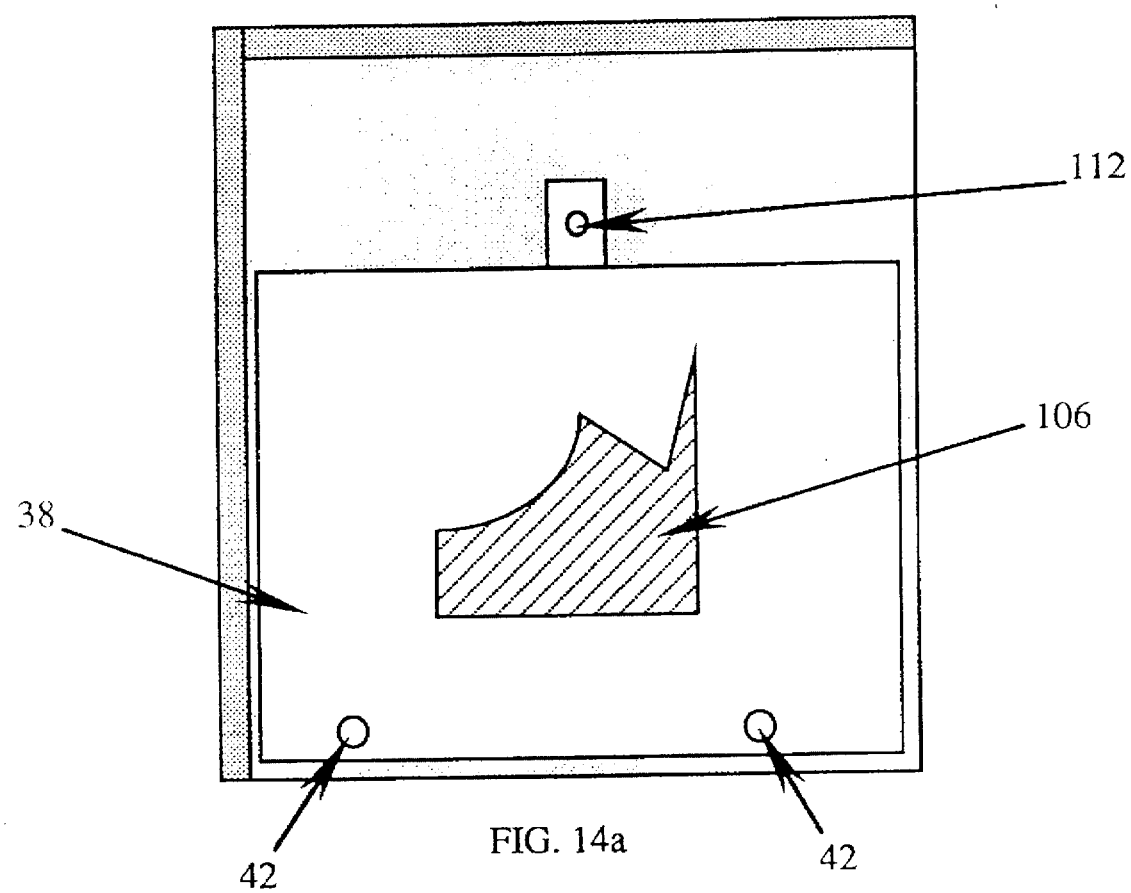
FIGS. 14a and 14b are similar to FIGS. 13a and 13b, respectively, and illustrate a selected registration hole placement.
Figure 14B:
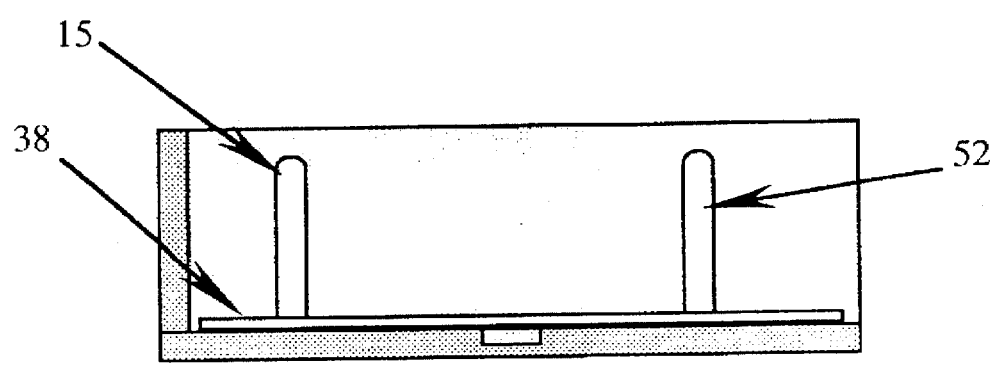

Registration holes outside part. FIGS. 14a and 14b illustrate an arrangement in which one or more holes 42 placed outside the part 106 can be used with guide pins 52 to register sequential sheets 38.

Figure 15A:
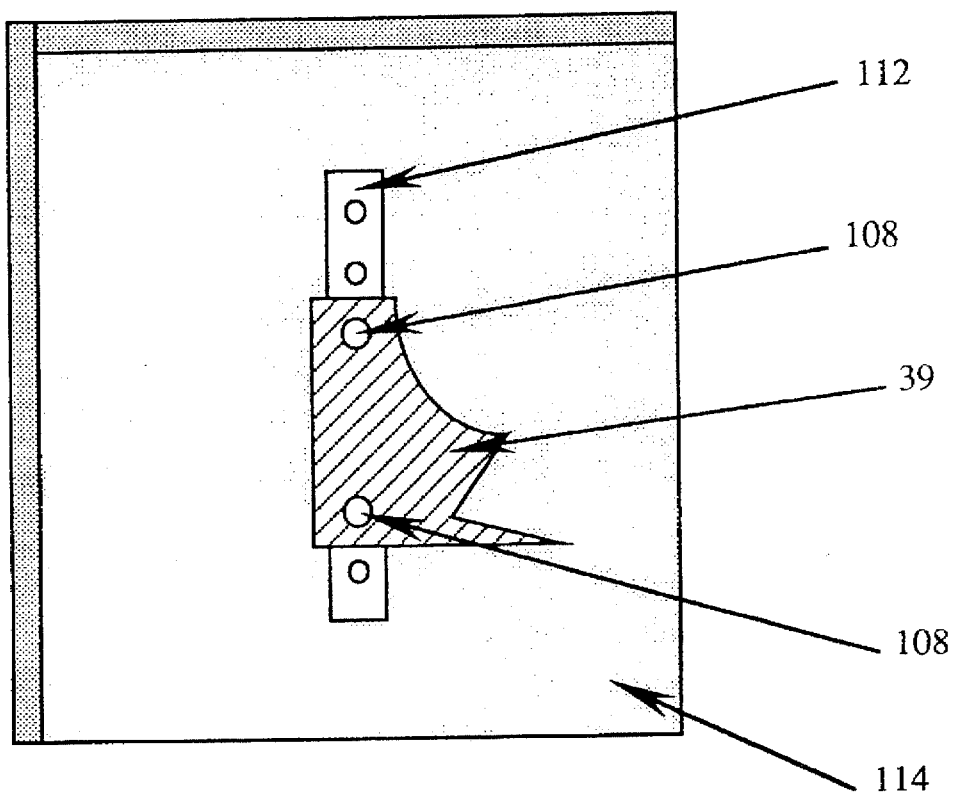
FIGS. 15a and 15b are similar to FIGS. 14a and 14b, respectively, and illustrate an alternative registration hole placement.
Figure 15B:
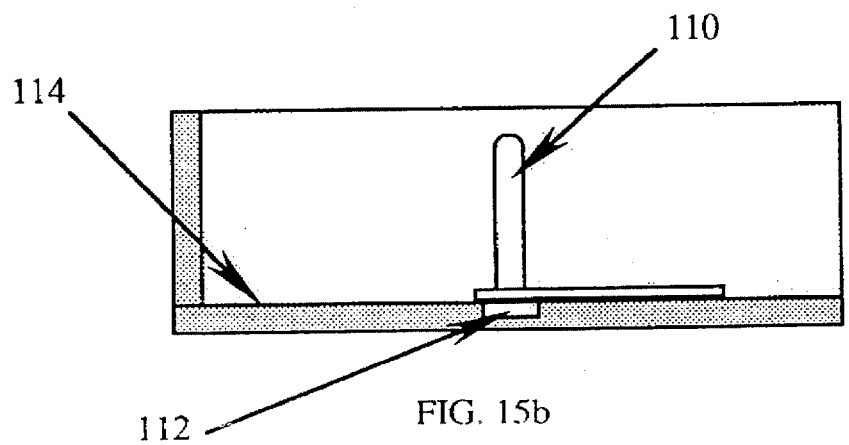

Registration holes in part. FIGS. 15a and 15b illustrate the manner in which cross section slice 39 alignment can be assured for parts having appropriate geometry by generating two registration holes 108 passing completely through each part. Sequential layers are guided by registration pins 110 extending from a pin plate 112 mounted in a recess in the platform 114, as shown.

Surface coating material:

After construction, the parts are given a coating to increase the rigidity of the parts, prevent layer delamination, and cover areas where the adhesive is exposed. Carpenter's glue thinned with tap water is useful for this purpose.

To utilize this device, the operator begins with a 3D model generated with a 3D CAD software. The file is stored in Stereolithography format. Using ZWSLICE, the file is loaded and viewed. The operator is prompted to select a slice orientation, and subsequently the part is displayed, sliced in this orientation, to verify the operator's selection. Changes are allowed at any time. When the operator is satisfied, the program evaluates the build area required for the part and then determines how many of these areas can be fit onto a single sheet (or page) of construction material.

The part is then automatically sliced into thick sections that occupy the maximum practical portion of surface area of the construction material. These thick sections are subsequently sliced into layers matching the construction material thickness, and a plot file is generated for each sheet of material required. Registration holes are automatically added to the plot file for sheet to sheet registration and for section to section (layer 36) registration. Each part cross section (slice 39) generated can be displayed to verify the intended result. The plot file (See FIG. 3) for each sheet of construction material can also be displayed.

When the operator is satisfied with the displayed information, the construction sheets can be cut. ZWSLICE prompts the operator in the operation of the plotter to generate all or any one of the construction sheets. Ideally, the plotter cutting pen is adjusted so that a single pass of the cutter cuts through the construction material but not the backing material. Registration holes 42, 58, 108 are cut completely through the backing material; e.g. by effecting multiple passes of the cutter.

Figure 16A:
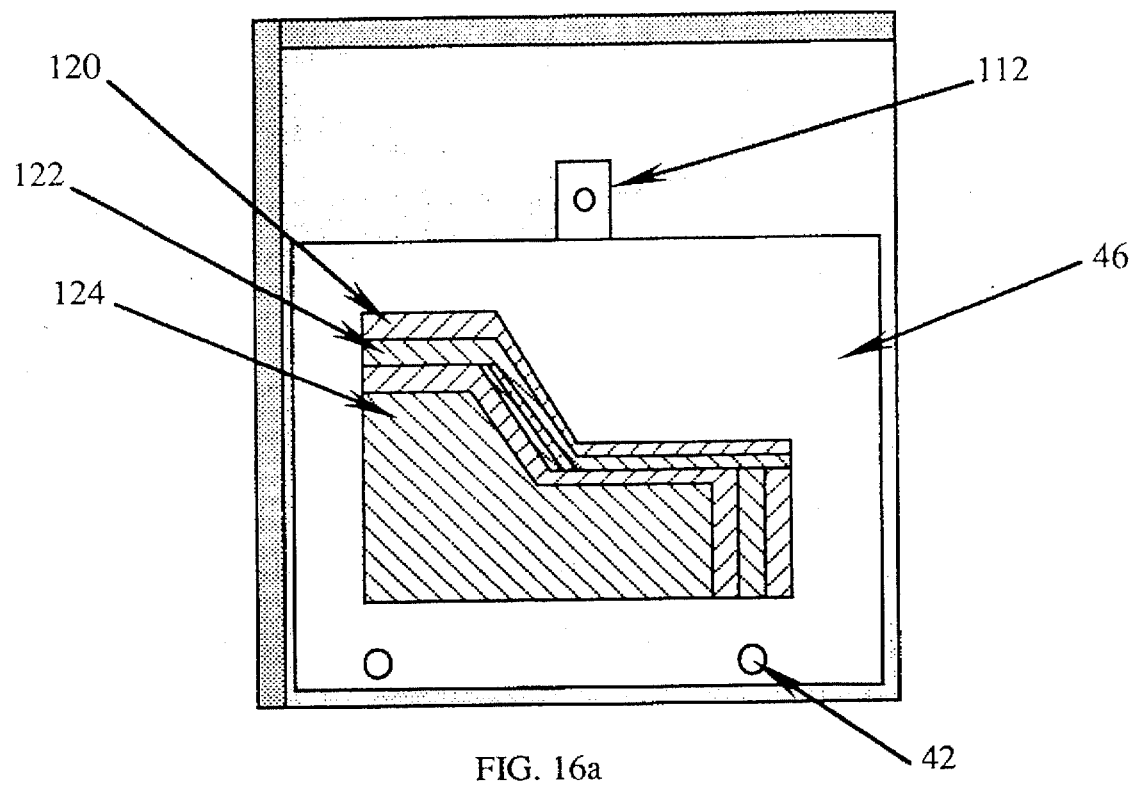
FIGS. 16a and 16b are similar to FIGS. 14a and 14b, respectively, and illustrate a partially constructed model.
Figure 16B:
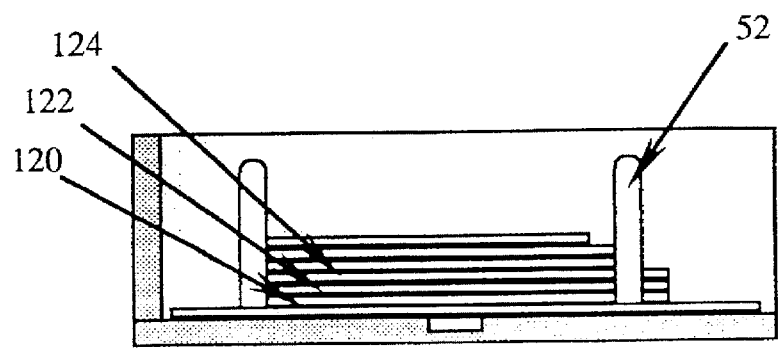

The part is assembled on the build table by sequentially registering and bonding the layers. Each sheet 38 contains two registration holes 42 corresponding to the two permanent registration pins 42 on the build table 100. The first layer and the last layer may also contain registration holes 58, 108 for each layer 36 of parts that have been decomposed into sections. The build process proceeds as shown by FIGS. 16a and 16b.

The top of the first sheet is coated with spray adhesive, and the excess construction material is peeled from the backing sheet, leaving only the part cross sections 120. This sheet is placed face up on the registration table 100 by carefully passing the registration pins 52 through the registration holes 42.

The second layer 122 is placed on the registration table face down by passing the registration pins 52 through the registration holes 42. The second sheet 122 is pressed firmly against the first sheet 120 to insure that the adhesive bonds the two layers together. The backing layer of the second sheet 122 is carefully removed, leaving the second layer cross section on the registration table, bonded to the first layer cross section. The second layer 122 is now positioned adhesive side up ready to bond to the next layer 124. (It is sometimes advisable to remove the excess construction material from the second sheet before registering and bonding this sheet. This prevents adhesive from the first layer which may overlap the excess material on the second sheet from bonding to that material.)

Subsequent layers are applied exactly as the second layer was applied. Care must be taken to insure that when the backing is peeled away, the cross section remains bonded to the registration table and the part is not peeled off the build table.

Figure 17A:
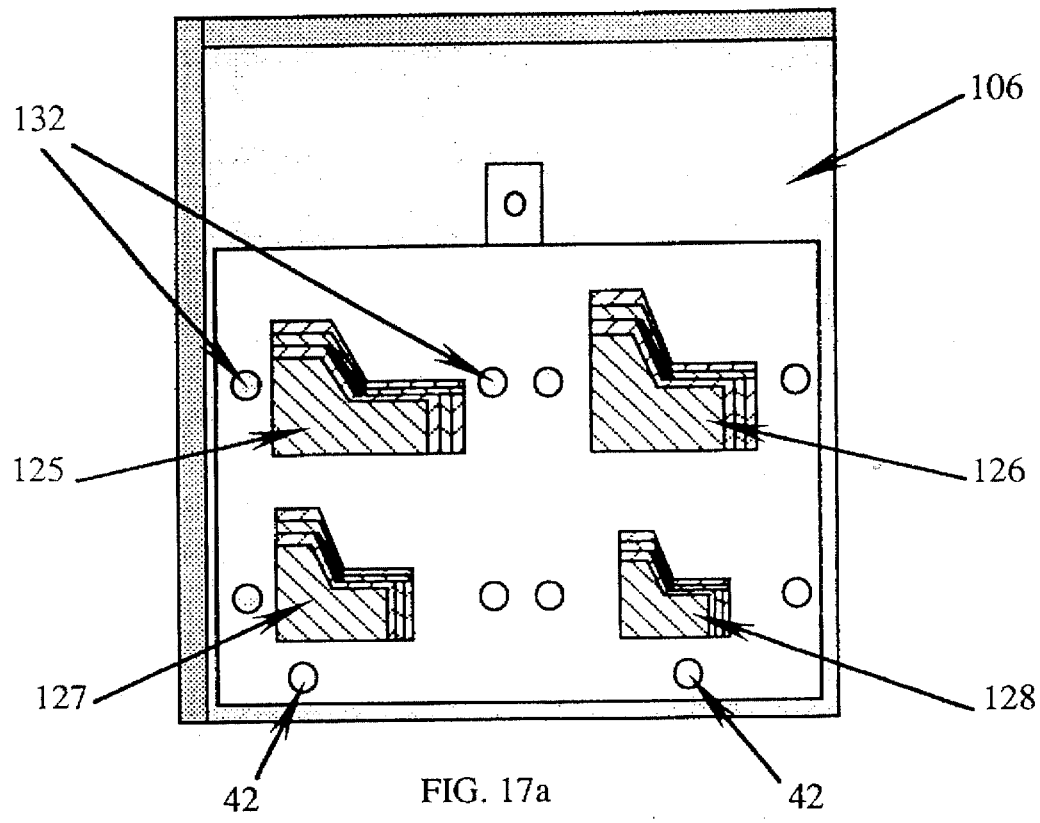
FIGS. 17a and 17b are similar to FIGS. 16a and 16b, respectively, and illustrate another partially constructed model.
Figure 17B:
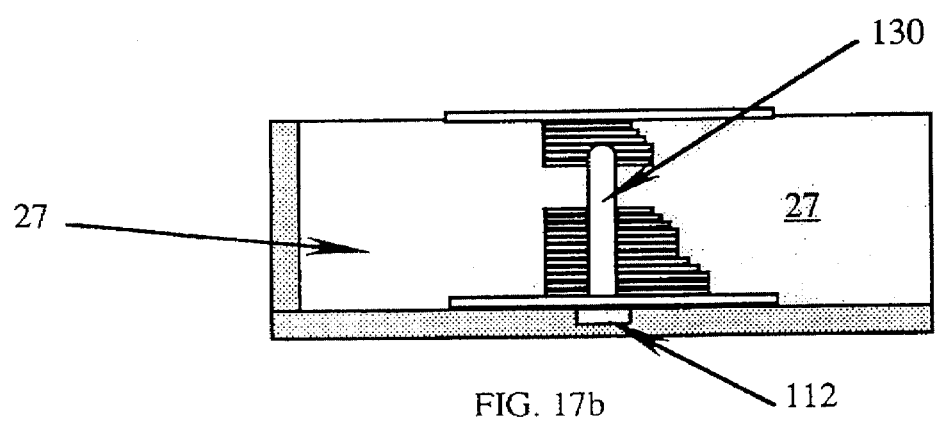
Figure 11:
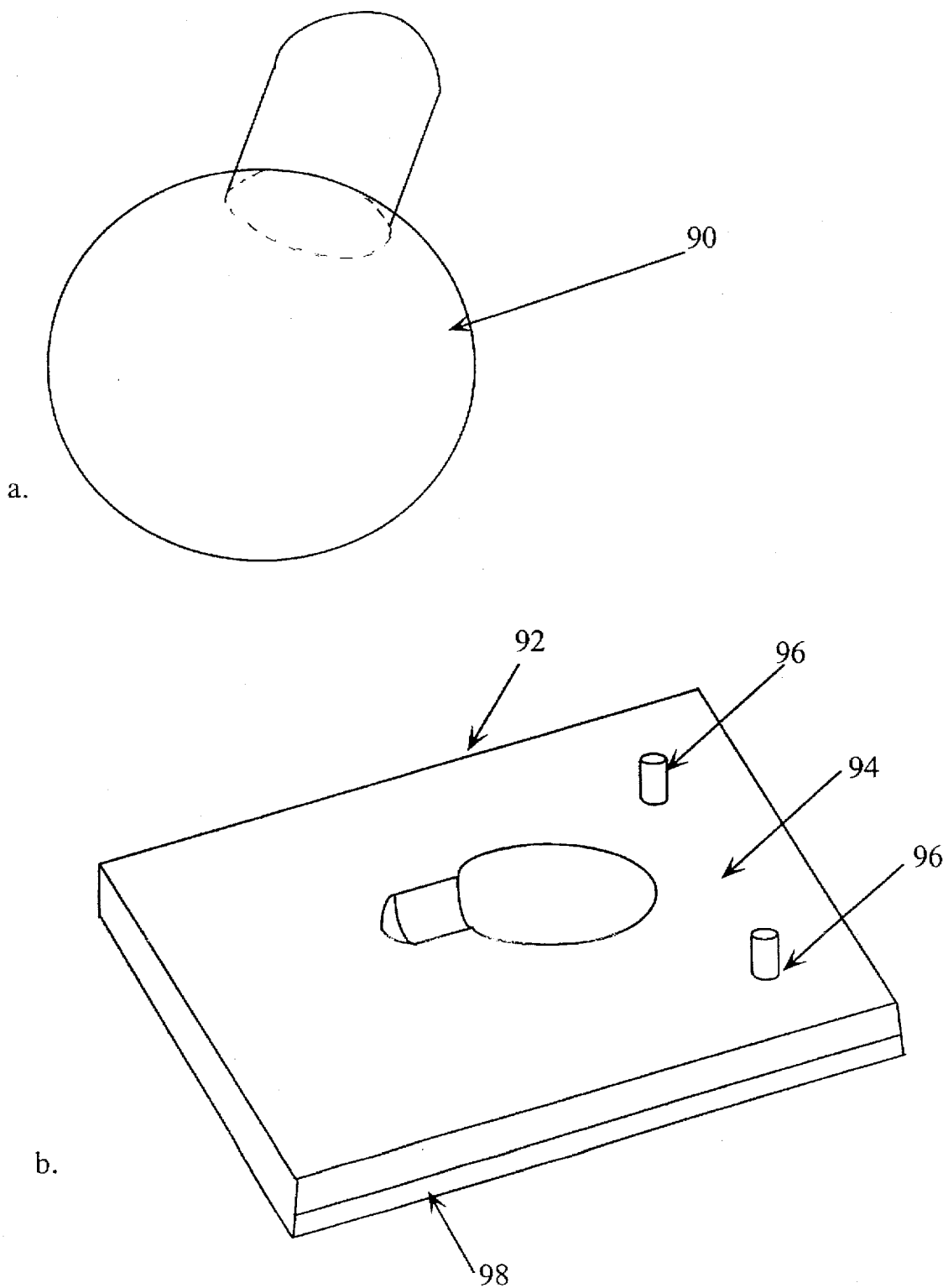

Parts that cover only a portion of the construction sheet can be sliced into thick sections 36 and assembled in a two step process. The first step proceeds as described in connection with FIGS. 16a and 16b, resulting in a construction sheet with several sections 125–128 adhered to its surface, as shown in FIGS. 17a and 17b. The second step of the assembly process proceeds as follows: When the last layer is applied, the backing material is not immediately removed. Because the part is being built in sections, it is important to note the orientation and order of the layers. ZWSLICE will display a building page that numbers the sections in order of lamination. These numbers may be marked on the upper surface backing material before the sheet holding the sections is removed from the registration table.

The entire assembly, containing an upper sheet, part sections, and a lower sheet is removed from the registration table 100. The sections 125–128 are cut apart, retaining the proper registration holes with each section.

Next, two registration pins 130 are threaded into the metal plate 112 in the center of the registration table. The spacing between the pins 130 should match that between the registration holes 132 on the sections 125–128.

The portion of the backing sheet that does not contain registration holes is peeled away from section 125. This section is placed on the registration table by passing the registration pins 52 through the registration holes 132. This section is positioned backing side down.

The backing sheet portion that does not contain registration holes is peeled away from section 126. This section is positioned on the registration table 100 by passing the registration pins 52 through the registration holes 132. This section is positioned backing side up. Section 126 should now be bonded to section 125. Sections 127, 128 and any subsequent sections are assembled just as section 126 was assembled.

Reference herein to details of the illustrated embodiments is not intended to limit the scope of the appended claims, which themselves recite those limitations regarded as definitive of the invention.

What is claimed is:

1. In a rapid prototype system wherein an object is decomposed into a series of layers, and a physical model of that object is then constructed by creating a first such layer and thereafter sequentially creating additional such layers and bonding each such additional layer to a previous layer, the improvement which comprises:

electronically decomposing said object into thick layers selected such that said thick layers may be positioned across an area corresponding to a sheet of construction material;

electronically slicing said thick layers into cross sections the thickness of said sheet of construction material;

plotting physical slices corresponding to said cross sections;

forming said physical slices from said construction material;

stacking said physical slices to construct said layers; and stacking said layers to recompose a physical model of said object.

2. An improvement according to claim 1, further including the step of selecting said thick layers to minimize the number of layers required to recompose said physical model.

3. An improvement according to claim 1 wherein said layers are defined by parting planes selected at regions of said object having relatively large dimensions, whereby to minimize overhangs during the step in which said physical slices are stacked to construct said layers.

4. An improvement according to claim 3 wherein a said layer is constructed as a mirror image, whereby to increase the area of contact between said layer and a support structure upon which said layer is constructed.

5. A rapid prototype method, comprising:

a. electronically decomposing an object into a series of relatively thick layers;

b. electronically slicing said thick layers into cross sections the thickness of a sheet of construction material;

c. plotting on sheets of said construction material physical slices corresponding to said cross sections;

d. cutting said physical slices from said sheets of construction material;

e. stacking said physical slices to construct said layers; and f. stacking said layers to recompose a physical model of said object.

6. A method according to claim 5, wherein said sheets of construction material include a construction layer and a backing layer fixed to said construction layer with adhesive material and wherein said physical slices are cut from said construction layer, leaving said backing layer intact.

7. A method according to claim 6, wherein:

individual pluralities of said physical slices are distributed in corresponding patterns among an ordered set of said construction sheets;

step c includes locating index positions on said sheets of construction material; and step d includes the placement of first registration holes at selected said index positions through said construction sheets;

whereby to facilitate the precise registration of respective said pluralities of said physical slices carried by individual said construction sheets within said set of construction sheets when all of said construction sheets are stacked in the order of said set with registration pins inserted through said registration holes.

8. A method according to claim 7, wherein second registration holes are located at second selected index locations to facilitate the precise registration of said layers when they are stacked to recompose said object.

9. A method according to claim 7, wherein steps e and f are conducted on a build platform including first registration pins positioned to receive said first registration holes provided in said sheets.

10. A method according to claim 9, wherein said build platform includes second registration pins positioned to receive second registration holes provided in said sheets, said second registration holes being located to facilitate the precise registration of said layers when they are stacked to recompose said object during step f.

11. A method according to claim 5, wherein steps a, b, c and d are controlled by a software operated means.

12. A method according to claim 5, wherein:

said construction material is in the form of flat sheets, each having a construction layer bonded to a backing layer; and step d is conducted such that said slices are cut through said construction layer, leaving said backing layer intact.

13. A method according to claim 12, wherein steps c and d are conducted such that registration holes are cut through said backing layer so that corresponding slices carried by respective said backing layers may be precisely registered during step e.

14. A method according to claim 13, wherein steps a, b, c and d are controlled by a software operated means.

* * * * *

UNITED STATES PATENT AND TRADEMARK OFFICE
CERTIFICATE OF CORRECTION

PATENT NO. : 5,663,883
DATED : September 2, 1997
INVENTOR(S) : Thomas et al.

It is certified that error appears in the above-identified patent and that said Letters Patent is hereby corrected as shown below:

In Column 3, line 46, change "is" to --are--;

In Column 3, line 46, change "representations" to --representation--;

In Column 3, line 58, change "is" to --are--;

In Column 3, line 58, change "views" to --view--;

In Column 3, line 64, after "8b" insert --are--;

In Column 5, line 19, after "layers--" insert --a--;

In Column 6, line 21, change "first" to --last--;

In Column 6, line 33, after "in" insert --.(period)--;

In Column 7, line 10, change "cress" to --cross--;

In Column 9, line 24, change "guide mils" to --guide rails--.

Signed and Sealed this

Second Day of June, 1998

*Attest:*

BRUCE LEHMAN

*Attesting Officer*    *Commissioner of Patents and Trademarks*